United States Patent [19]

Stewart et al.

[11] 3,972,606
[45] Aug. 3, 1976

[54] ADVANCEMENT OF FILM STRIPS OF DIFFERENT WIDTHS AND/OR SPROCKET HOLE SIZES

[76] Inventors: Wilton A. Stewart; Ann M. Stewart, both of 16624 Linda Terrace, Pacific Palisades, Calif. 90272

[22] Filed: June 17, 1974

[21] Appl. No.: 479,908

[52] U.S. Cl. .................................. 352/79; 352/187; 226/76
[51] Int. Cl.² ........................................... G03B 1/24
[58] Field of Search ............ 352/79, 187, 188, 189, 352/190, 233, 235, 241; 276/52, 54, 76, 78, 79

[56] References Cited
UNITED STATES PATENTS

| 1,318,610 | 10/1919 | Sereinsky .......................... 352/241 |
| 1,490,279 | 4/1924 | Kucharski ...................... 352/187 X |
| 1,979,700 | 11/1934 | May .................................. 226/86 X |
| 3,053,142 | 9/1962 | Wittel ................................. 352/79 |
| 3,240,116 | 3/1966 | Stamm ............................ 226/79 X |
| 3,499,706 | 3/1970 | Hanson et al. .................. 352/241 X |
| 3,512,693 | 5/1970 | Utsumi .............................. 226/54 |

FOREIGN PATENTS OR APPLICATIONS

| 360,329 | 4/1906 | France .............................. 352/241 |
| 360,330 | 4/1906 | France .............................. 352/241 |

*Primary Examiner*—L. T. Hix
*Assistant Examiner*—Alan Mathews
*Attorney, Agent, or Firm*—William W. Haefliger

[57] ABSTRACT

A rotary sprocket disc for driving motion picture film is characterized in its construction by sprocket teeth enabling interchangeable transporting of film strips of different dimensions. Certain teeth are so disposed around the sprocket disc that they will mesh with or engage the holes in different film strips, the latter having different strip widths, tooth hole sizes, and pitches.

12 Claims, 11 Drawing Figures

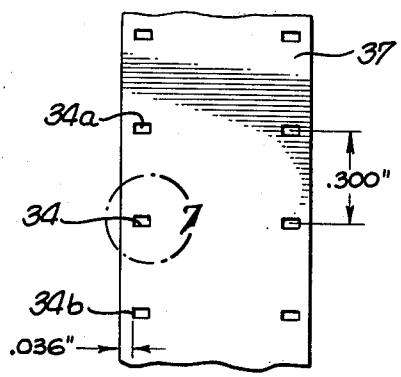
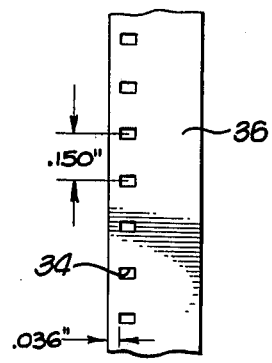
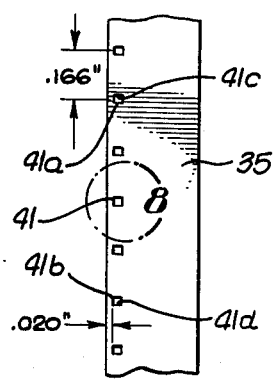
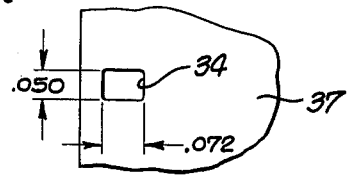
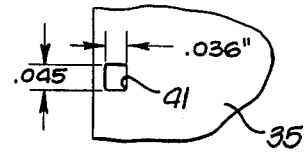
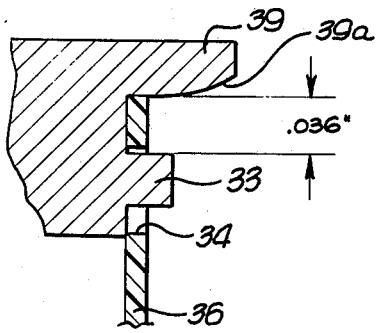
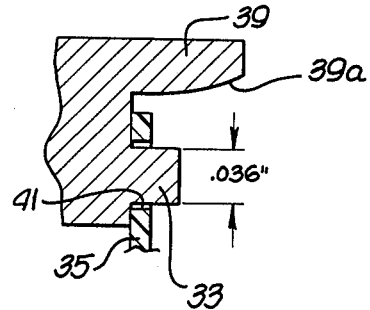
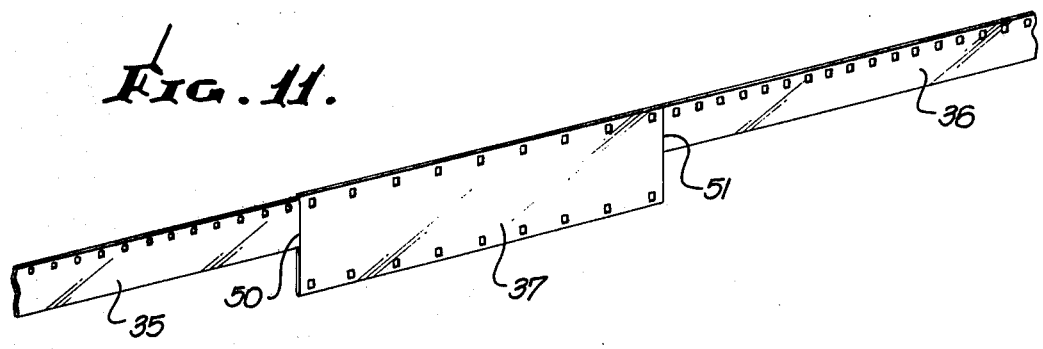

ADVANCEMENT OF FILM STRIPS OF DIFFERENT WIDTHS AND/OR SPROCKET HOLE SIZES

BACKGROUND OF THE INVENTION

This invention relates generally to the transport of motion picture film, and more particularly concerns the provision of means whereby motion picture films of differing dimensions can be interchangeably transported, for projection, by one support disc.

Motion pictures are commonly produced on 16mm, 8mm, or Super-8 film. Different projection equipment is normally employed for each such film, due to disparity of film widths and sprocket hole dimensions. There is a need for simple and improved projection equipment capable of handling at least two and preferably all three such films, to reduce the cost and need for multiple projectors.

SUMMARY OF THE INVENTION

It is a major object of the invention to meet the above need through provision of a cantilevered support disc for motion picture film, with sprocket teeth and other means located to guidably engage and transport film of various widths, as described. As will be seen, the invention is embodied in a rotary sprocket disc having a periphery of a width to support only edge portions of the different film strips, the disc having peripheral teeth, successive like teeth having spacing greater than the sequential sprocket hole spacings in each film strip. Certain of such teeth have center-to-center spacing of about 1.500 inches, and are sized to approximately fill the holes in standard Super-8 film, but only loosely fit the holes in 16mm and 8mm film. In order to guide the latter, the disc may incorporate a flange spaced from the teeth to engage the edges of 16 and 8mm film, as will be seen.

Others of the like teeth on the sprocket are grouped in pairs, the two teeth of each pair respectively located fore and aft of the aforementioned certain teeth, so as to interfit corresponding holes in the various films and provide, if deemed necessary, additional steadiness of the film transverse to the direction of transport.

Finally, the invention contemplates the splicing together of film strips of different sizes, as referred to, to be transported on a sprocket as described.

These and other objects and advantages of the invention, as well as the details of an illustrative embodiment, will be more fully understood from the following description and drawings, in which:

DRAWING DESCRIPTION

FIGS. 4, 5 and 6 are fragmentary showings of three types of motion picture film, respectively;

FIG. 7 is an enlarged showing of a designated portions of FIG. 4;

FIG. 8 is an enlarged showing of a designated portion of FIG. 6;

FIG. 9 is an enlarged section showing the meshing of the drive sprocket with FIG. 4 film;

FIG. 10 is an enlarged section showing the meshing of the drive sprocket with FIG. 6 film; and FIG. 11 is a perspective showing of the use of the drive sprocket to drive spliced together films as seen in FIGS. 4–6.

DETAILED DESCRIPTION

Figure 1:
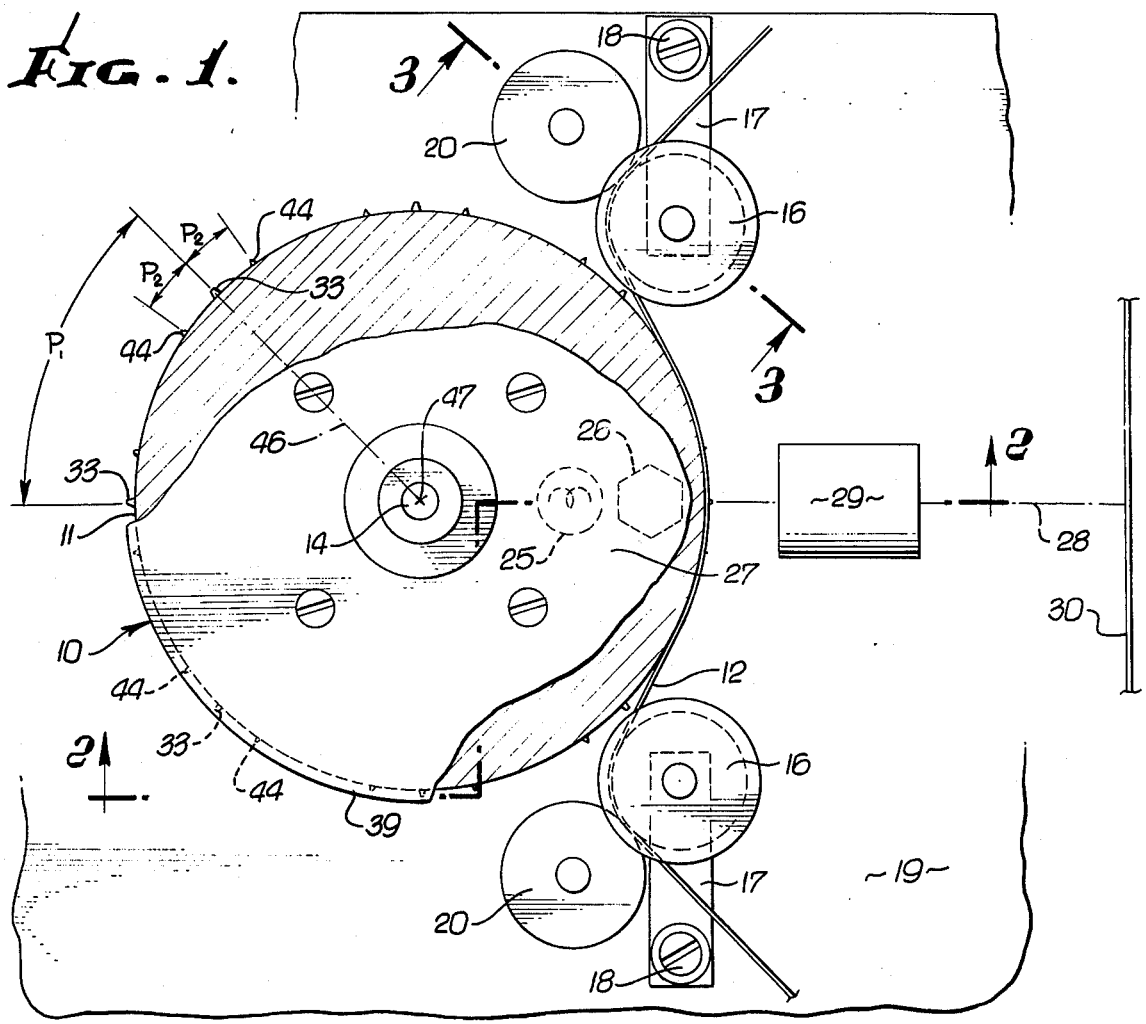
FIG. 1 is an elevation of one preferred form of the invention.
Figure 2:
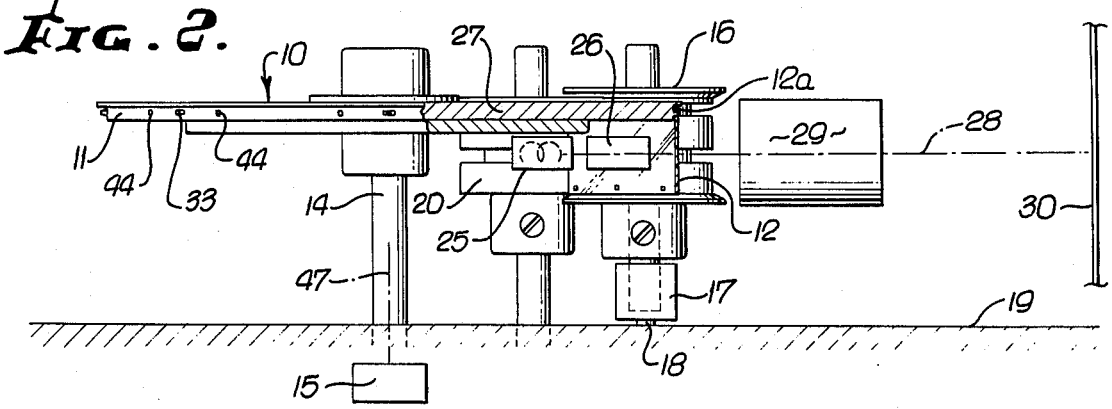
FIG. 2 is a section on lines 2—2 of FIG. 1.
Figure 3:
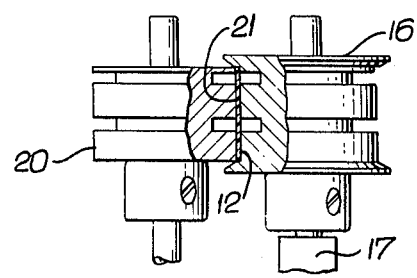
FIG. 3 is a section of lines 3—3 of FIG. 1.

In FIGS. 1–3, a rotary sprocket disc 10 has a periphery 11 of a width to support only edge portions of film strips during film advancement. FIG. 2 shows one such film strip 12, projecting freely in cantilever relation from its supported edge portion 12a. Merely as illustrative, the sprocket may be carried by a rotary shaft 14. Adjustable film guide rollers 16 may be carried as by links 17 pivotally supported at 18 to a carrier plate 19, the guide rollers then extending proximate the disc. Additional guide rollers 20 may be optionally provided to extend peripherally adjacent the surfaces 21 of rollers 16, as is seen in FIG. 3. Rollers 20 are not bodily swingable. Accordingly, the film is always in rolling contact with its supports, and scratching of the film during its transport is eliminated due to absence of sliding contact.

The disc 10 may be driven, as at 14 and 15, to transport the film with the guide rollers free wheeling and film take-up and supply tension supplied by external means, or, the disc and guide rollers may all be free wheeling with the film transport and take-up and supply tension applied by external means.

Due to the reduced thickness of the disc 10, an optional element such as a light source 25, shutter 26, or both may be located proximate the film side 27 of the disc to project a light beam 28 through the film. That beam then passes through a projection lens unit 29 for projection into a screen 30. In this regard, and as will be seen, the cantilevered film support permits projection of any format size up to the maximum capacity of the lamp, shutter and optics, using only one film support disc; also, the circular curvature of the disc 10 maintains the cantilevered film at an exact and predetermined focal position. Further, the curvature of the disc is selected sufficiently small (i.e. of sufficiently large diameter) that the center and extremities of the projected film formats will be within the depth of focus of the projection optics. Merely by way of example, a disc with a one-foot circumference provides the additional advantage of simple footage counting (one revolution of the disc equals one foot of film transported).

In accordance with an important aspect of the invention, the location, spacing and relative size of the sprocket teeth on the disc are such as to permit the support and transport of 16mm, 8mm and/or Super-8mm motion picture film. For this purpose, a circumferential row of teeth projecting at the periphery of the disc is characterized in that successive like teeth have spacing greater than the sequential sprocket hole spacings in each of the film strips to be transported (such strips characteristically having different widths or sprocket hole sizes. In this regard, the hole-to-hole spacing in the 16mm film 37 seen in FIG. 4 is greater than the hole-to-hole spacing in each of the 8mm and Super-8mm films 36 and 35 of FIGS. 5 and 6 respectively; the width of the FIG. 4 film is greater than the FIG. 5 and FIG. 6 film widths; and the individual hole dimensions for FIG. 4 and FIG. 5 films, as better seen in FIG. 7, are different from the hole dimensions for the FIG. 6 film, as better seen in FIG. 8.

More specifically, certain of the successive like teeth have center-to-center "pitch distance" spacing $P_1$ of 1.500 inch, or an integral multiple there of such teeth for example appearing at 33 in FIGS. 1, 9 and 10; further, each of such teeth preferably has an approximately rectangular cross section (in a plane normal to a radius 46 to the tooth from the disc axis 47) of about (for example, slightly less than) 0.036 by 0.045 inch, in order to closely fit within the boundaries of the hole 41 defined by the Super-8mm film of FIG. 6. Such close meshing is depicted in FIG. 10, every ninth hole in the Super-8 film strip 35 being approximately filled by a tooth 33. Accordingly, the teeth 33 have pitch spacing which is an integral multiple of the pitch spacing of successive sprocket holes in each of the various film strips to be advanced by the disc.

With regard to the 8mm film strip 36 of FIG. 5, every tenth hole in the film receives a tooth 33, whereas with respect to the 16mm film strip 37 of FIG. 4, every fifth hole in the film receives a tooth 33. Regarding these two film sizes, the disc 10 includes a peripheral flange 39 laterally spaced from the sprocket disc teeth to guidingly engage the edge of the film strips 36 and 37 being transported. In particular, that flange is spaced from the teeth 33 by the approximate amount 0.036 inches, this being the nominal spacing between the hole and film edge in each of the film strips 36 and 37, as seen in FIGS. 4 and 5. Accordingly, the fact that the tooth does not laterally fill the hole 34 in either of strips 36 and 37 is not detrimental to desired lateral guidance or positioning. Note flange edge curvature or rounding at 39a.

Others of the like teeth on the sprocket disc are grouped in pairs about the disc periphery, the two teeth of each pair respectively located fore and aft of each of the certain teeth 33, circumferentially of the disc, and with like center-to-center spacing therefrom $P_2$ of about 0.318 inch. Such teeth, indicated at 44, FIG. 1 are adapted to mesh with holes 41a and 41b in the Super-8 film strip 35 FIG. 6 next fore and aft of the hole 41 receiving tooth 33, (as for example are seen in FIG. 6), and to engage the edges 41c and 41d of such teeth from hole 41. Teeth 44 provide lateral guidance to the Super-8 film strip 35. Of course, teeth 44 must penetrate holes 34a and 34b on the film strips 36 and 37 with clearance, or else they would interfere with the transport of such film strip. Circumferential registration, i.e. steadiness, is obtained by engagement of the leading edge of the tooth with the leading edge of the perforation for all the film strips. The circumferential dimensions of such other teeth 44 are substantially less than 0.045 inch, i.e. about 0.004 inch, so as not to mismatch the holes 34 in film 37. Lateral guidance of the Super-8 film strip 35 is obtained by the 0.036 (approximately) lateral widths of all teeth 33 and 44.

A final aspect of the invention concerns the provision of at least two motion picture film strips spliced together to be transported on a sprocket (as for example that described above) interfitting holes in both strips, the two strips selected from the group that includes 16mm film, 8mm film and Super-8 film. FIG. 11 illustrates the condition as described, as well as the condition that all three strips are spliced together to be transported by the sprocket. The splice locations are seen at 50 and 51.

We claim:

1. In apparatus for advancing moving picture film strips having sequential sprocket holes spaced therein along the film strips length, and including the film strips respectively having different widths, sprocket hole sizes, sprocket hole locations and/or sprocket hole pitch spacings, which pitch spacings are not solely a multiple of two, the combination comprising a. a rotary sprocket disc having a periphery of a width to support only edge portions of the film strips during film advancement,
   b. a circumferential row of sprocket teeth carried by the disc to project outwardly from said periphery for entraining said film strips, at least one film strip entrained on the sprocket teeth, so as to project widthwise freely beyond an edge of said disc periphery and in unsupported relation, successive like teeth having pitch spacing greater than the sequential sprocket hole pitch spacings in each of said film strips, certain of said successive like teeth having center-to-center pitch spacing which is an integral multiple other than two of the pitch spacing of successive sprocket holes in each of said film strips,
   c. said center-to-center pitch spacing of said certain successive like teeth being about 1.50 inches or an integral multiple thereof.

2. The combination of claim 1 wherein each of said certain like teeth has an approximately rectangular cross sectional dimensions of about 0.036 inch by 0.045 inch in a plane normal to a radius to said tooth from an axis defined by said disc.

3. The combination of claim 1 wherein each of said certain like teeth is sized to approximately fill the sprocket hole defined by standard Super-8 film.

4. The combination of claim 1 wherein others of said like teeth are grouped in pairs about the periphery of said disc, the two other teeth of each pair respectively located fore and aft of each of said certain teeth, circumferentially of the disc, and with like spacing therefrom of about 0.318 inch.

5. The combination of claim 1 wherein the disc includes a peripheral flange spaced from said teeth to guidingly engage the edge of at least one of said film strips.

6. The combination of claim 1 wherein the disc includes a circumferential flange projecting radially outwardly and spaced from said certain teeth by the approximately distance 0.036 inch.

7. The combination of claim 4 wherein said other teeth have circumferential dimensions which are substantially less than 0.045 inch.

8. The combination of claim 1 wherein at least two of said film strips are spliced together in end-to-end relation to be driven by the sprocket disc, the respective film strips having different widths or sprocket hole size, the sprocket holes in successive strips being in alignment lengthwise of the film.

9. The combination of claim 1 including an optical element located proximate the film side of the disc to project a light beam through the film.

10. The combination of claim 8 wherein 8mm film and Super-8mm film are spliced together to be transported by said sprocket.

11. The combination of claim 8 wherein 16mm film and Super-8mm film are spliced together to be transported by said sprocket.

12. In apparatus for advancing moving picture film strips having sequential sprocket holes spaced therein along the film length, and including the strips having different sprocket hole sizes, sprocket hole locations and/or sprocket hole pitch spacings, which pitch spacings are not solely a multiple of two, the combination comprising a. a rotary sprocket disc to support the film strips during film advancement,
b. a circumferential row of sprocket teeth carried by the disc to project outwardly from said periphery for entraining said film strips, at least one film strip entrained on the teeth, successive like teeth having pitch spacing greater than the sequential sprocket hole spacings in each of said film strips, certain of said successive like teeth having center-to-center pitch spacing which is an integral multiple other than two of the pitch spacing of successive sprocket holes in each of said film strips, said center-to-center pitch spacing of said certain successive like teeth being about 1.50 inches or an integral multiple thereof, and
c. the disc including a circumferential flange projecting radially outwardly and spaced from said teeth by the approximate distance 0.036 inch,
d. said disc supporting the film between the teeth.

* * * * *